(12) United States Patent
Yates

(10) Patent No.: US 12,416,306 B2
(45) Date of Patent: Sep. 16, 2025

(54) BEARING BLOCK FOR A GEAR PUMP ASSEMBLY

(71) Applicant: Rolls-Royce plc, London (GB)

(72) Inventor: Martin K. Yates, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/953,445

(22) Filed: Nov. 20, 2024

(65) Prior Publication Data

US 2025/0188924 A1    Jun. 12, 2025

(30) Foreign Application Priority Data

Dec. 12, 2023   (GB) ...................................... 2318901

(51) Int. Cl.
  *F04C 2/08*   (2006.01)
  *F04C 2/18*   (2006.01)
  *F02C 7/22*   (2006.01)

(52) U.S. Cl.
  CPC ................ *F04C 2/082* (2013.01); *F04C 2/18* (2013.01); *F02C 7/22* (2013.01); *F04C 2210/1044* (2013.01); *F04C 2240/50* (2013.01); *F04C 2250/00* (2013.01)

(58) Field of Classification Search
  CPC .... F04C 2/082; F04C 2/18; F04C 2210/1044; F04C 2240/50; F04C 2250/00; F04C 2240/30; F04C 2/14; F04C 2/084; F02C 7/22

See application file for complete search history.

(56) References Cited

U.S. PATENT DOCUMENTS

| 1,991,562 | A | * | 2/1935 | Lucas | ..................... | B61F 15/06 |
| | | | | | | 384/427 |
| 3,632,240 | A | * | 1/1972 | Dworak | ................... | F04C 2/086 |
| | | | | | | 418/179 |
| 4,523,365 | A | * | 6/1985 | Richmond | .............. | F16C 33/14 |
| | | | | | | 29/898.07 |

(Continued)

FOREIGN PATENT DOCUMENTS

| CN | 108397483 A | 8/2018 |
| EP | 1722103 A2 | 11/2006 |

(Continued)

OTHER PUBLICATIONS

Great Britain search report dated Jun. 12, 2024, issued in GB Patent Application No. 2318901.2.

(Continued)

*Primary Examiner* — Jesse S Bogue

(57) ABSTRACT

A bearing block adapted for use in a gear pump assembly. The bearing block includes a bearing surface configured to face one or more gears. The bearing block further includes a bearing block body formed with a recess. The bearing block further includes an insert located within the recess. The insert includes an insert body including an outer surface. The insert body has a tapered shape that tapers outwardly from the bearing surface. The insert further includes a plurality of ridges disposed on the outer surface. The plurality of ridges defines one or more grooves therebetween. The recess includes a tapered shape complementary to the tapered shape of the insert body, such that the insert body engages with the bearing block body.

9 Claims, 7 Drawing Sheets

(56) References Cited

U.S. PATENT DOCUMENTS

| | | | |
|---|---|---|---|
| 6,716,010 B2 | 4/2004 | Eaton et al. | |
| 7,607,906 B2 * | 10/2009 | Yates | F04C 15/0026 |
| | | | 418/206.7 |
| 10,330,145 B2 * | 6/2019 | Yates | F01C 21/02 |

FOREIGN PATENT DOCUMENTS

| | | | |
|---|---|---|---|
| EP | 1722103 B1 | 2/2011 | |
| FR | 2722126 A1 | 1/1996 | |
| GB | 1117816 A | 6/1968 | |

OTHER PUBLICATIONS

European search report dated Apr. 29, 2025, issued in EP Patent Application No. 24212857.7.

* cited by examiner

BEARING BLOCK FOR A GEAR PUMP ASSEMBLY

CROSS-REFERENCE TO RELATED APPLICATIONS

This specification is based upon and claims the benefit of priority from United Kingdom patent application number GB 2318901.2 filed on Dec. 12, 2023, the entire contents of which is incorporated herein by reference.

BACKGROUND

Technical Field

The present disclosure relates to a bearing block, and in particular, to a bearing block adapted for use in a gear pump assembly.

Description of the Related Art

A fuel supply system of a gas turbine engine typically includes a gear pump assembly for pumping the fuel. The gear pump assembly generally operates over a large rotational speed operating range to provide fuel flow for various functions. The gear pump assembly includes a pair of intermeshing gears, one of which is arranged to drive the other. Rotation of the gears drive the fuel from an inlet side (i.e., low pressure side) of the gear pump assembly to an outlet side (i.e., high pressure side) of the gear pump assembly.

Intermeshing teeth of the gears change the pressure of the fluid located therein. This may lead to formation of bubbles and subsequently cavitation erosion of the gear pump assembly. Each gear is supported by bearing blocks with a bearing surface. The bearing surfaces of the bearing blocks are commonly made of a lead bronze material and can be damaged by cavitation erosion.

It is known to provide the bearing surfaces with inserts of a material of improved erosion resistance. One of the ways is to locate a peg in a corresponding opening or recess in the bearing block. The peg is disposed by an interference fit and held in position by a retaining pin. However, cavitation erosion of the surrounding bearing block may result in a leakage path being formed between the peg and the bearing block resulting in damage of the bearing block and in some cases, the teeth of the gears. This may lead to inefficient operation of the gear pump assembly.

European patent EP1722103 B1 describes a method in which stepped or tapered inserts of a cavitation resistant material, such as aluminium bronze, is inserted into the bearing substrate (lead bronze) and is then encapsulated using a sprayed aluminium backing.

The present disclosure describes an improvement to this method of retaining the insert for an improved bearing block for a gear pump assembly which is not susceptible to cavitation erosion.

SUMMARY

According to a first aspect, a bearing block adapted for use in a gear pump assembly is disclosed. The bearing block includes a bearing surface configured to face one or more gears of the gear pump assembly. The bearing block further includes a bearing block body formed with a recess. The bearing block further includes an insert located within the recess of the bearing block body. The recess and insert are shaped so as to be of smaller dimensions at the bearing surface of the bearing block than at a point remote therefrom within the bearing block. The insert includes an insert body including an outer surface. The insert body has a tapered shape that tapers outwardly from the bearing surface. The insert further includes a plurality of ridges disposed on the outer surface of the insert body. The plurality of ridges defines one or more grooves therebetween. The recess includes a tapered shape complementary to the tapered shape of the insert body, such that the insert body engages with the bearing block body. A material of the bearing block body plastically deforms around the plurality of ridges and flows into each of the one or more grooves to improve a mechanical retention of the insert within the recess.

As the material of the bearing block body plastically deforms around the plurality of ridges and flows into each of the one or more grooves upon engagement of the insert body with the bearing block body, there is minimal movement of the insert relative to the bearing block body. In other words, the plastic deformation of the material of the bearing block body around the plurality of ridges and the flow of the material of the bearing block body into each of the one or more grooves may mitigate any movement of the insert relative to the bearing block body. Therefore, as compared to conventional inserts for bearing blocks, the bearing block of the present disclosure includes the insert in such a way that the insert is firmly retained by the bearing block with minimal, if any, risk of the insert becoming loose.

The improved mechanical retention of the insert in the bearing block body may avoid fluid leakage between high and low pressure sides of the gear pump assembly. This minimal fluid leakage between the high and low pressure sides may improve an efficiency of the gear pump assembly. By providing the bearing block of the present disclosure with improved mechanical retention of the insert within the recess, any significant damage to the gear pump assembly may be prevented which could otherwise happen due to movement of the insert relative to the bearing block body.

In some embodiments, the tapered shape of each of the insert body and the recess is frustoconical. Such tapered frustoconical shape of the each of the insert body and the recess may enhance mechanical retention of the insert within the recess.

In some embodiments, each of the plurality of ridges is annular. The plurality of annular ridges defines corresponding one or more annular grooves. In case of the plurality of annular ridges, when the insert body engages with the bearing block body, the plastically deformed material of the bearing block body flows into each of the one or more annular grooves. The plastically deformed material may fully surround the insert body at the one or more annular grooves. Therefore, the presence of annular ridges as well as annular grooves may further improve the mechanical retention of the insert within the recess.

In some embodiments, the insert is made of aluminium bronze. Aluminium bronze has a good cavitation erosion resistance whilst also having relatively good bearing properties.

In some embodiments, the material of the bearing block body is lead bronze. As lead bronze is of low stiffness and strength, the bearing block body may plastically deform around the plurality of ridges upon engagement of the insert body with the bearing block body, thereby allowing improved mechanical retention of the insert within the recess. Lead bronze material also provides good bearing properties to the bearing block body.

In some embodiments, the insert is flush or substantially flush with the bearing surface. As a result, there is minimum risk of causing undue wear or damage to the gears. As the insert lies flush with the bearing surface, formation of a leakage path between the high and low pressure sides of the gear pump assembly is avoided.

According to a second aspect, a gear pump assembly for pumping a fluid is disclosed. The gear pump assembly includes an inlet configured to receive the fluid, an outlet, and a plurality of the bearing blocks of the first aspect. The gear pump assembly further includes a pair of intermeshing gears located between the plurality of bearing blocks and rotatable to pump the fluid from the inlet to the outlet. Providing the bearing blocks of the first aspect in the gear pump assembly may improve an efficiency and performance of the gear pump assembly.

According to a third aspect, a fuel supply system of a gas turbine engine is disclosed. The fuel supply system includes the gear pump assembly of the second aspect for pumping a fuel. Providing the gear pump assembly of the second aspect in the fuel supply system of the gas turbine engine may improve an efficiency and performance of the fuel supply system.

According to a fourth aspect, a gas turbine engine including the fuel supply system of the third aspect is disclosed. Providing the fuel supply system of the third aspect in the gas turbine engine may increase an efficiency of the gas turbine engine.

According to a fifth aspect, a method of manufacturing the bearing block of the first aspect is disclosed. The method includes providing the recess in the bearing block body. The method further includes pushing the insert into the recess of the bearing block body. The method further includes subjecting the bearing block body to a hydrostatic pressure that causes the material of the bearing block body to plastically deform around the plurality of ridges and flow into each of the one or more grooves, thereby improving the mechanical retention of the insert within the recess.

As the material of the bearing block body plastically deforms around the plurality of ridges and flows into each of the one or more grooves upon application of hydrostatic pressure on the bearing block body, there is minimal movement of the insert relative to the bearing block body in the bearing block manufactured by the method of the fifth aspect of the present disclosure. Therefore, as compared to conventional methods for manufacturing bearing blocks, the method of the present disclosure manufactures the bearing block in such a way that the insert is firmly retained by the bearing block with minimal, if any, risk of the insert becoming loose.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or in the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e., the values may form upper or lower bounds), for example in the range of from 80 Nkg-1s to 100 Nkg-1s, or 85 Nkg-1s to 95 Nkg-1s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying Figures. Further aspects and embodiments will be apparent to those skilled in the art.

Figure 1:
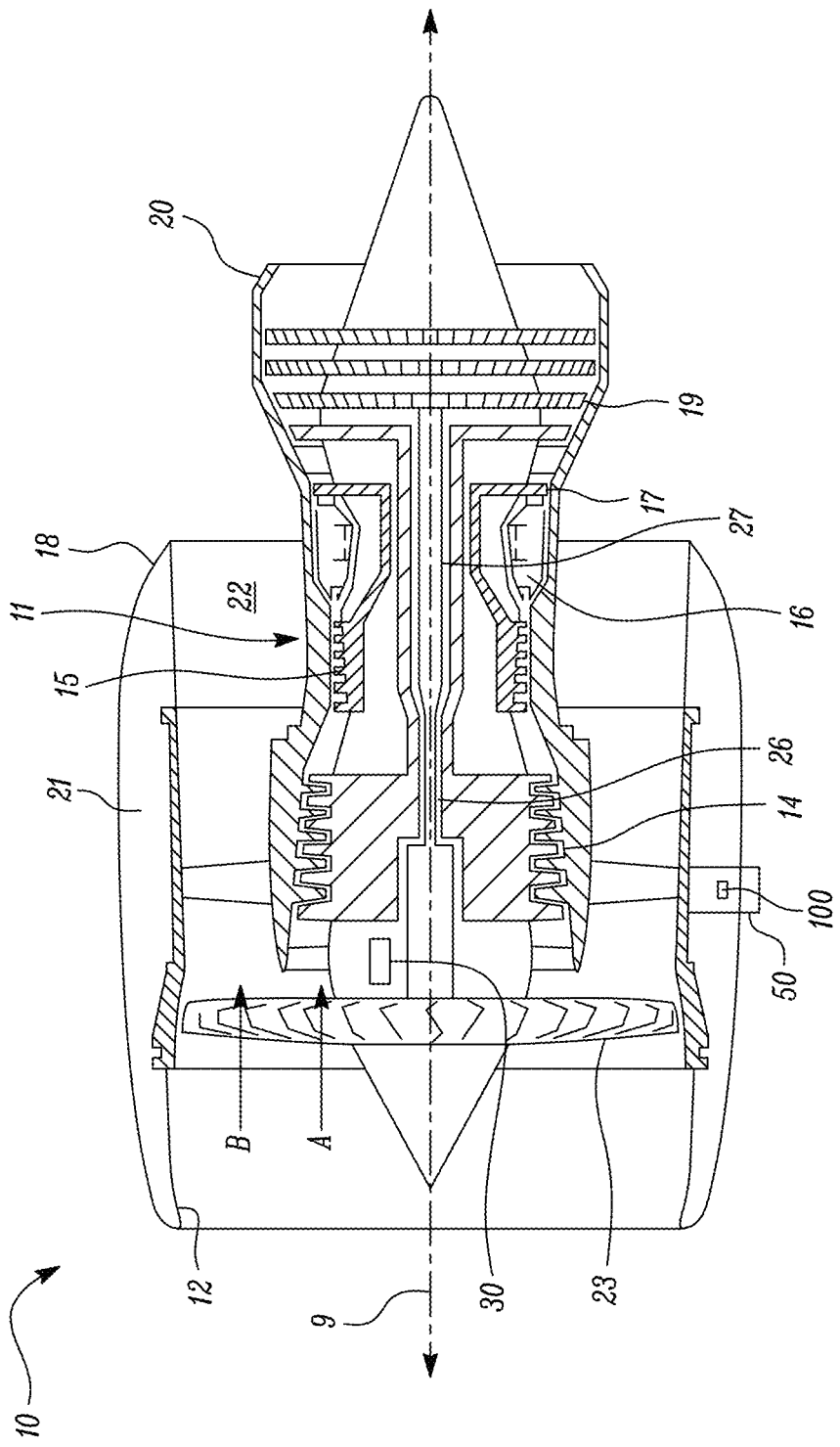
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine 10 (i.e., not including the gearbox output shaft that drives the fan 23). In some literature, the "low pressure turbine" and "low pressure compressor" referred to herein May alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

In addition, the present disclosure is equally applicable to aero gas turbine engines, marine gas turbine engines, and land-based gas turbine engines.

The gas turbine engine 10 further includes a fuel supply system 50 (shown schematically in FIG. 1) to supply adequate amount of fuel to the gas turbine engine 10. The fuel supply system 50 includes a gear pump assembly 100 for pumping a fuel or a fluid. The fuel supply system 50 may also include other parts (not shown), such as an auxiliary gear box attached to the engine core 11.

Figure 2:
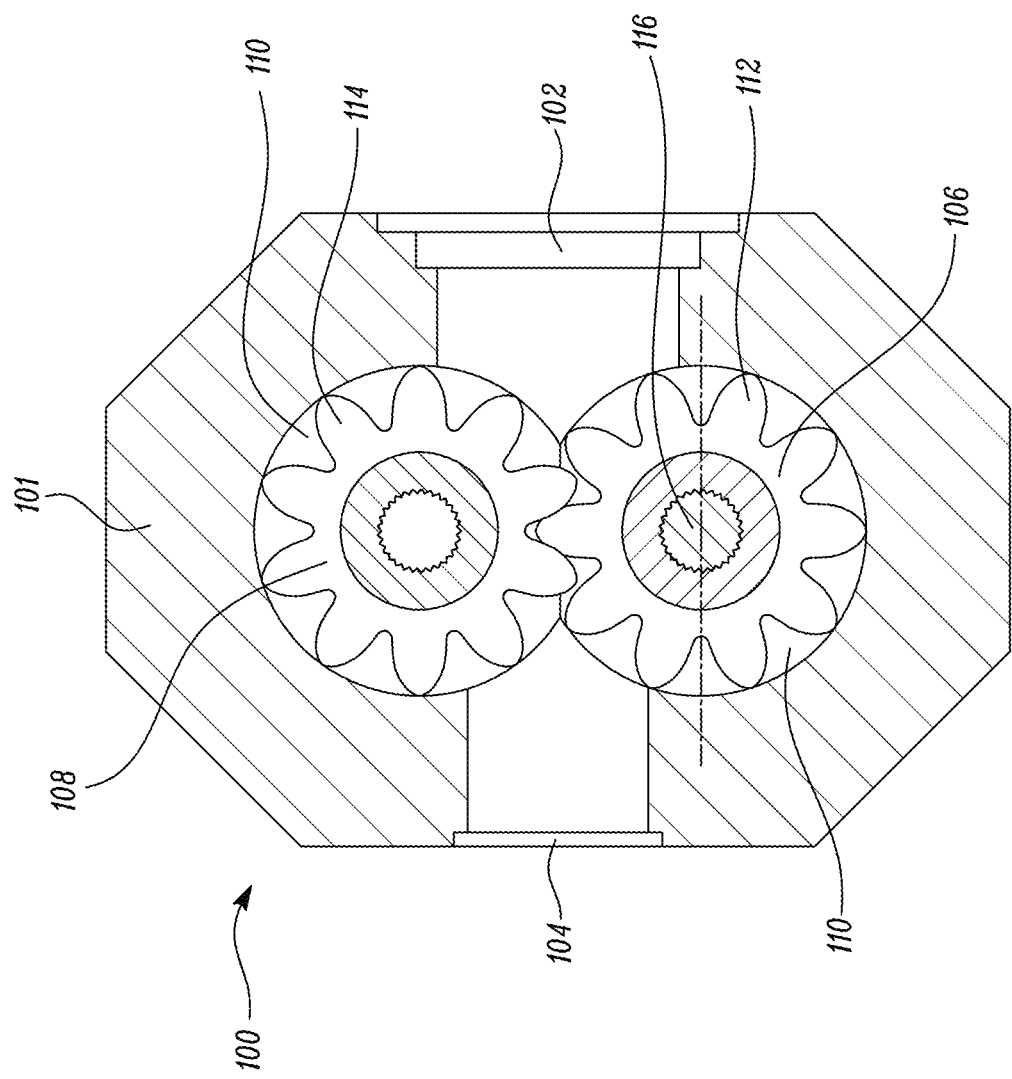
FIG. 2 is a sectional view of a gear pump assembly for pumping a fluid in the gas turbine engine of FIG. 1, according to an embodiment of the present disclosure.

FIG. 2 shows a sectional view of the gear pump assembly 100, according to an embodiment of the present disclosure. The gear pump assembly 100 may be a twin pinion gear fuel pump. Here, the gear pump assembly 100 is shown for use in the fuel supply system 50 of the gas turbine engine 10. However, in other embodiments, the gear pump assembly 100 can be used in other applications as well.

The gear pump assembly 100 includes a housing 101, an inlet 102 configured to receive the fluid, and an outlet 104 to discharge the fluid. The gear pump assembly 100 further includes a pair of intermeshing gears 106, 108 disposed in the housing 101. The gears 106, 108 are rotatable to pump the fluid from the inlet 102 to the outlet 104. The gear pump assembly 100 further includes a plurality of bearing blocks 110 adapted for use in the gear pump assembly 100. The plurality of bearing blocks 110 support the gears 106, 108. The gears 106, 108 are located between the plurality of bearing blocks 110.

Each of the gears 106, 108 is provided with corresponding teeth 112, 114 arranged to mesh with one another. The gear 106 is mounted upon a drive shaft 116 which is driven for rotation to cause rotation of the gear 106. The other gear 108 is also mounted for rotation within the housing 101. The rotation of the gear 106 causes rotation of the gear 108 by virtue of the intermeshing of the teeth 112, 114. In use, fluid is driven by the gears 106, 108 from the low pressure side (inlet side) of the gear pump assembly 100 between the gears 106, 108 and the housing 101 to the high pressure side (outlet side) thereof. Some gears, bearings, and shafts are not shown in FIG. 2 for illustrative purposes.

Figure 3:
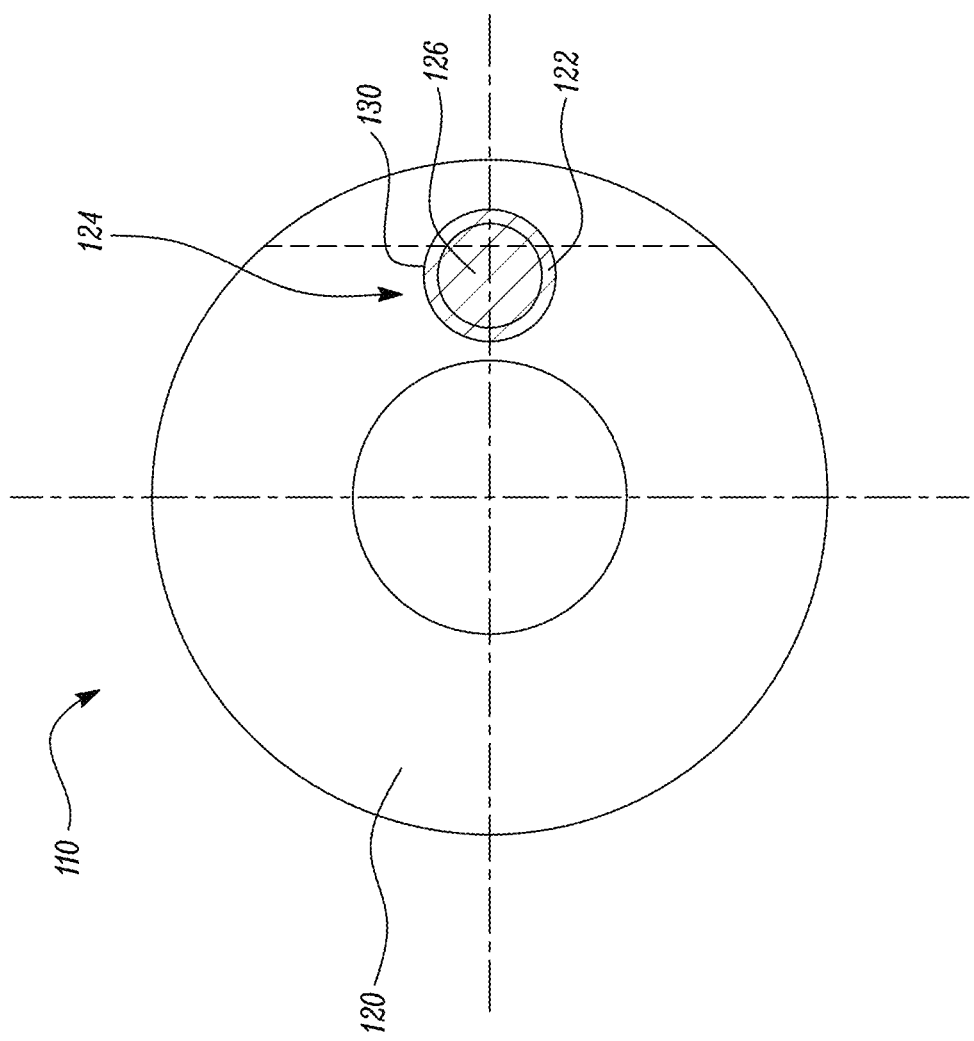
FIG. 3 is a top view of a bearing block of the gear pump assembly.
Figure 4:
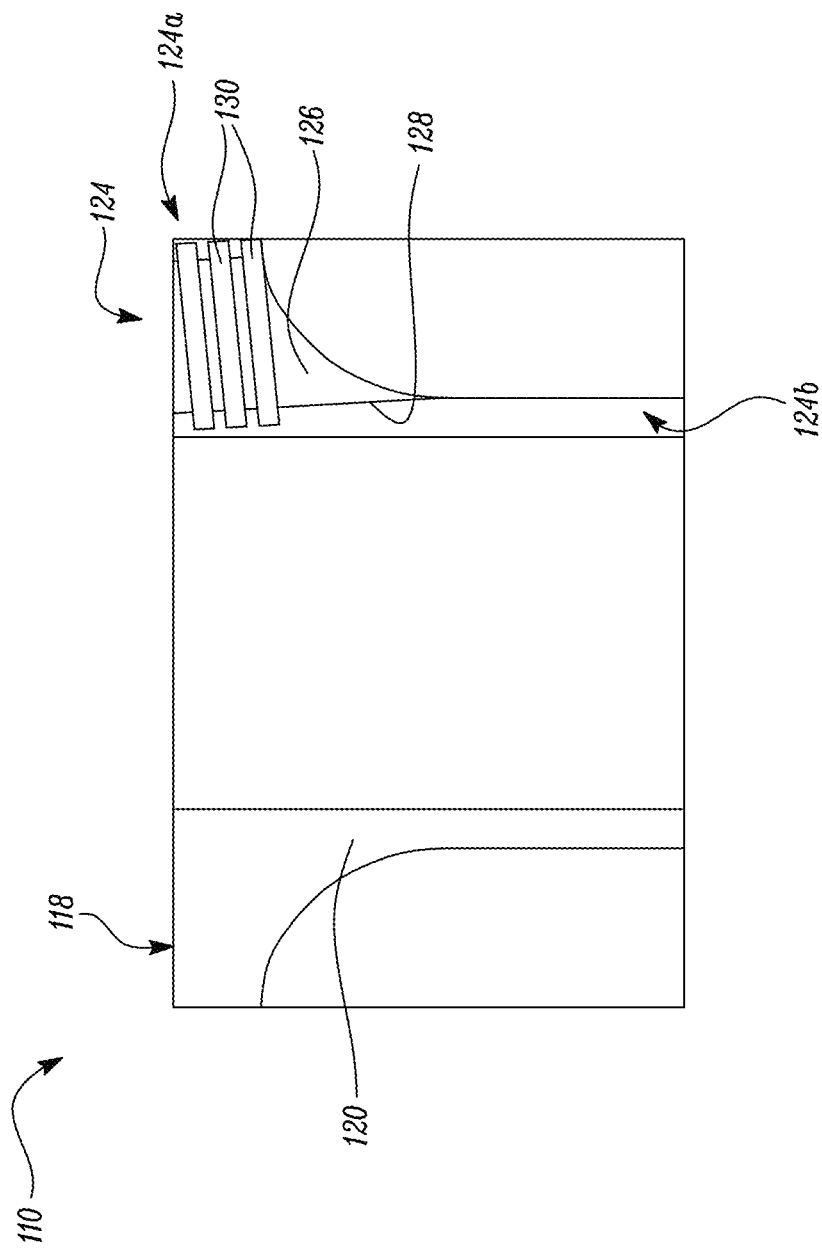
FIG. 4 is a sectional side view of the bearing block of FIG. 3.

FIG. 3 is a top view of the bearing block 110, according to an embodiment of the present disclosure. FIG. 4 is a sectional side view of the bearing block 110, according to an embodiment of the present disclosure. Referring to FIGS. 2 to 4, the bearing block 110 includes a bearing surface 118 (shown in FIG. 4) configured to face one or more gears (i.e., the gears 106, 108) of the gear pump assembly 100.

Generally, the intermeshed teeth 112, 114 and bearing surface 118 of the bearing block 110 together serve to define isolated chambers (not shown) which move, upon rotation of the gears 106,108 and cause variations in the fluid pressure therein. The variations in fluid pressure can give rise to formation of bubbles in the fluid in the chambers, and the subsequent collapse of the bubbles. The bearing block 110 is of such design and material that there is negligible cavitation erosion of the bearing block 110.

The bearing block 110 further includes a bearing block body 120 formed with a recess 122. The bear block body 120 may be a cylindrical body. In some embodiments, the material of the bearing block body 120 is lead bronze. Lead bronze material also provides good bearing properties to the bearing block body 120. In some other embodiments, the material of the bearing block body 120 may be aluminium bronze.

Figure 5:
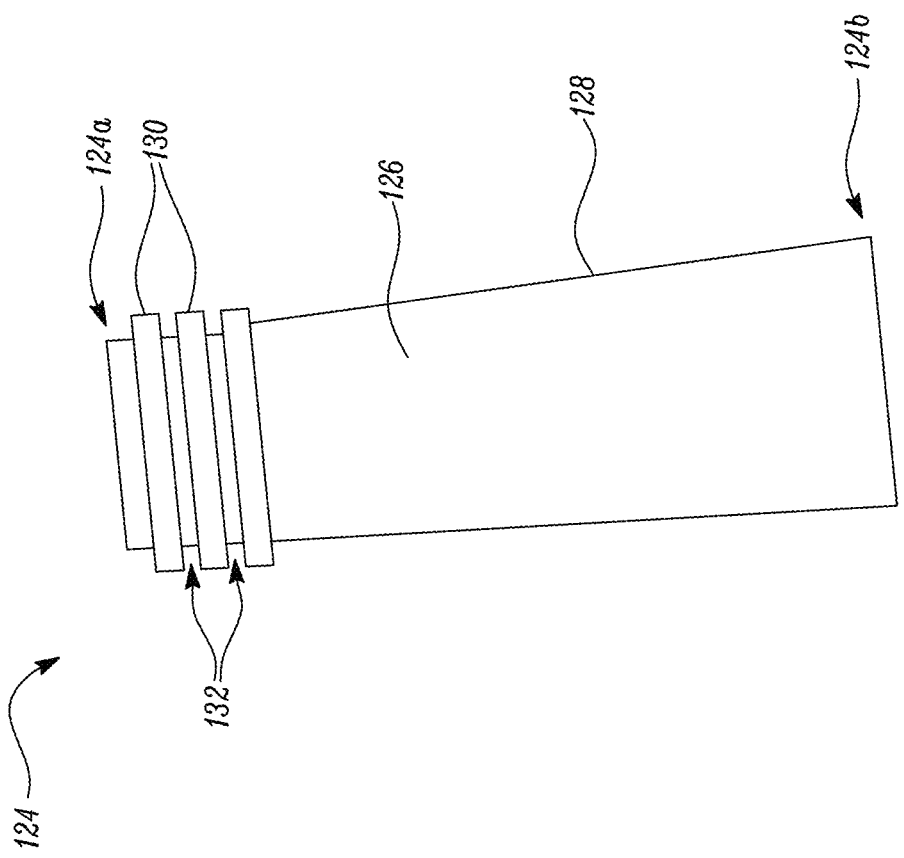
FIG. 5 is a side view of an insert of the bearing block of FIG. 3.

The bearing block 110 further includes an insert 124 located within the recess 122 of the bearing block body 120. FIG. 5 is a side view of the insert 124, according to an embodiment of the present disclosure. Referring to FIGS. 2 to 5, the insert 124 is made of a material better capable of withstanding cavitation erosion than the lead bronze material of the bearing block body 120. In some embodiments, the insert 124 is made of aluminium bronze. Aluminium bronze has a good cavitation erosion resistance whilst also having relatively good bearing properties.

In some embodiments, the insert 124 is flush or substantially flush with the bearing surface 118. As a result, there is minimum risk of causing undue wear or damage to the gears 106, 108. As the insert 124 lies flush with the bearing surface 118, formation of a leakage path between the high and low pressure sides of the gear pump assembly 100 is avoided. In some cases, a machining operation may be carried out to result in the insert 124 and the bearing surface 118 lying flush with one another. The insert 124 defines a first end 124a disposed adjacent to the bearing surface 118 and a second end 124b disposed within the bearing block 110 and remote from the bearing surface 118.

The recess 122 and insert 124 are shaped so as to be of smaller dimensions at the bearing surface 118 of the bearing block 110 than at a point remote therefrom within the bearing block 110. The dimensions of the insert 124 and the recess 122 are such that, when the insert 124 has been fully introduced into the recess 122, part of the insert 124 lies flush with the bearing surface 118.

The insert 124 includes an insert body 126 including an outer surface 128. The insert body 126 has a tapered shape that tapers outwardly from the bearing surface 118. In some embodiments, the tapered shape of each of the insert body 126 and the recess 122 is frustoconical. Such tapered frustoconical shape of the each of the insert body 126 and the recess 122 may enhance mechanical retention of the insert 124 within the recess 122. In some embodiments, the insert 124 and the recess 122 may be of double dove-tail shaped form as viewed from the bearing surface 118.

The insert 124 further includes a plurality of ridges 130 disposed on the outer surface 128 of the insert body 126. The plurality of ridges 130 is disposed proximal to the first end 124a and distal to the second end 124b of the insert 124. The plurality of ridges 130 defines one or more grooves 132 therebetween. In other words, every two adjacent ridges 130 from the plurality of ridges 130 define one groove 132 therebetween. In the illustrated embodiment of FIGS. 4 and 5, the insert 124 includes thee ridges 130 defining two grooves 132 therebetween. However, a number of the ridges 130 may be varied as per application requirements. In some embodiments, the plurality of ridges 130 extends along a portion of the length between the first end 124a and the second end 124b of the insert 124. In some embodiments, the plurality of ridges 130 extends along 30% of the length between the first end 124a and the second end 124b of the insert 124.

The recess 122 includes a tapered shape complementary to the tapered shape of the insert body 126, such that the insert body 126 engages with the bearing block body 120. The material of the bearing block body 120 plastically deforms around the plurality of ridges 130 and flows into each of the one or more grooves 132 to improve a mechanical retention of the insert 124 within the recess 122. As the material (e.g., lead bronze) of the bearing block body 120 is of low stiffness and strength, the bearing block body 120 may plastically deform around the plurality of ridges 130 upon engagement of the insert body 126 with the bearing block body 120, thereby allowing improved mechanical retention of the insert 124 within the recess 122.

As the material of the bearing block body 120 plastically deforms around the plurality of ridges 130 and flows into each of the one or more grooves 132 upon engagement of the insert body 126 with the bearing block body 120, there is minimal movement of the insert 124 relative to the bearing block body 120. In other words, the plastic deformation of the material of the bearing block body 120 around the plurality of ridges 130 and the flow of the material of the bearing block body 120 into each of the one or more grooves 132 may mitigate any movement of the insert 124 relative to the bearing block body 120. Therefore, as compared to conventional inserts for bearing blocks, the bearing block 110 of the present disclosure includes the insert 124 in such a way that the insert 124 is firmly retained by the bearing block 110 with minimal, if any, risk of the insert 124 becoming loose.

The improved mechanical retention of the insert 124 in the bearing block body 120 may avoid fluid leakage between high and low pressure sides of the gear pump assembly 100. This minimal fluid leakage between the high and low pressure sides may improve an efficiency of the gear pump assembly 100. By providing the bearing block 110 of the present disclosure with improved mechanical retention of the insert 124 within the recess 122, any significant damage to the gear pump assembly 100 may be prevented which could otherwise happen due to movement of the insert 124 relative to the bearing block body 120. In some embodiments, each of the plurality of ridges 130 is annular. The plurality of annular ridges 130 defines corresponding one or more annular grooves 132. In case of the plurality of annular ridges 130, when the insert body 126 engages with the bearing block body 120, the plastically deformed material of the bearing block body 120 flows into each of the one or more annular grooves 132. The plastically deformed material may fully surround the insert body 126 at the one or more annular grooves 132. Therefore, the presence of annular ridges 130 as well as annular grooves 132 may further improve the mechanical retention of the insert 124 within the recess 122.

Figure 6:
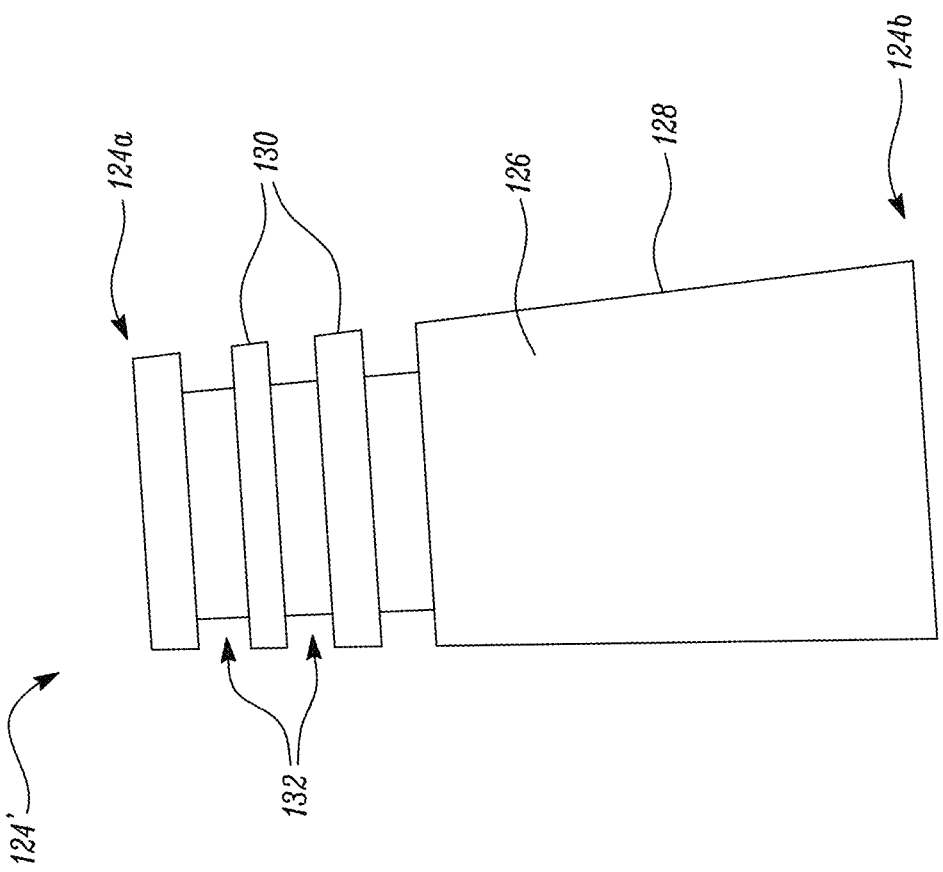
FIG. 6 is a side view of an insert, according to another embodiment of the present disclosure.

FIG. 6 is a side view of an insert 124', according to another embodiment of the present disclosure. The insert 124' is substantially similar to the insert 124 of FIG. 5, with common components being referred to by the same numerals. However, in the insert 124', the one or more grooves 132 are provided by machining a portion of the outer surface 128 (i.e., outer diameter in this embodiment) of the insert body 126. In this embodiment, the one or more grooves 132 define the plurality of ridges 130 therebetween. In other words, it can again be stated that the plurality of ridges 13 define the one or more grooves 132 therebetween.

Figure 7:
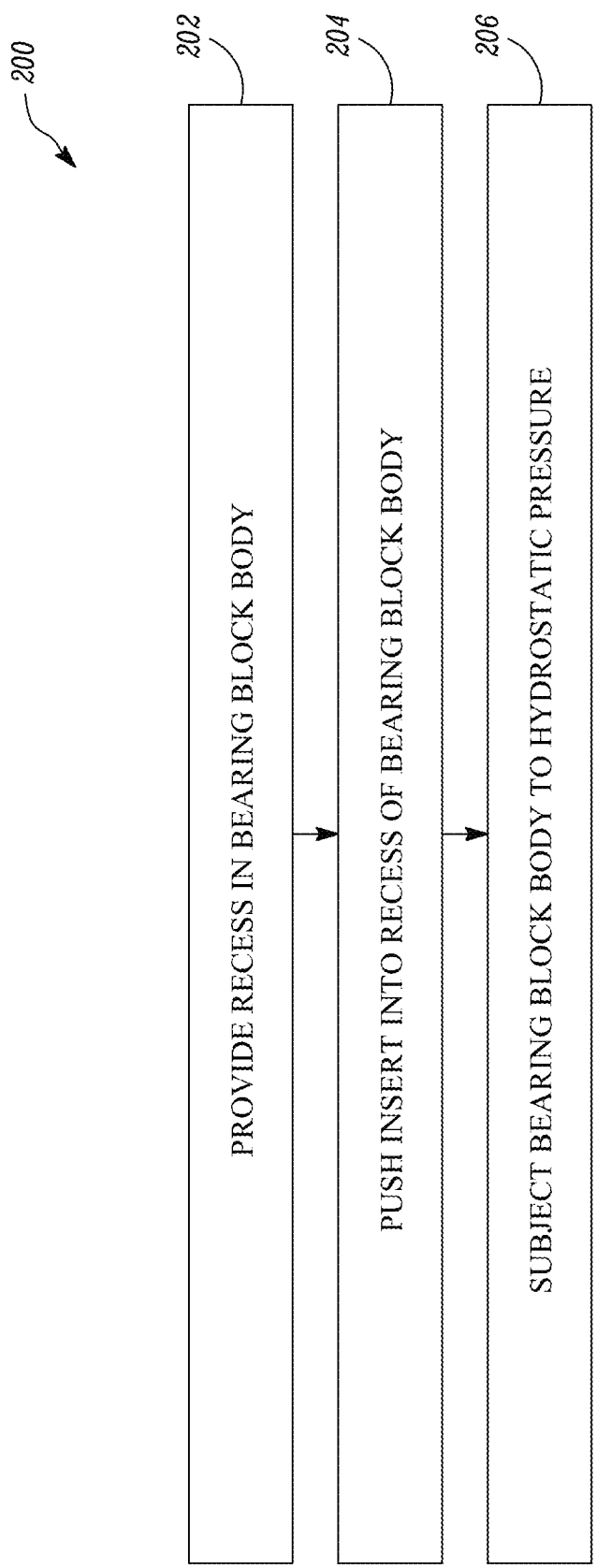
FIG. 7 is a flowchart for a method for manufacturing the bearing block of FIG. 3, according to an embodiment of the present disclosure.

FIG. 7 is a flowchart for a method 200 for manufacturing the bearing block 110 of FIG. 3, according to an embodiment of the present disclosure. Referring to FIGS. 2 to 7, at step 202, the method 200 includes providing the recess 122 in the bearing block body 120. The recess 122 may be provided by machining the bearing block body 120. At step 204, the method 200 includes pushing the insert 124 (or the insert 124' of FIG. 6) into the recess 122 of the bearing block body 120.

At step 206, the method 200 further includes subjecting the bearing block body 120 to a hydrostatic pressure that causes the material of the bearing block body 120 to plastically deform around the plurality of ridges 130 and flow into each of the one or more grooves 132, thereby improving the mechanical retention of the insert 124 (or the insert 124') within the recess 122.

As the material of the bearing block body 120 plastically deforms around the plurality of ridges 130 and flows into each of the one or more grooves 132 upon application of hydrostatic pressure on the bearing block body 120, there is minimal movement of the insert 124 relative to the bearing block body 120 in the bearing block 110 manufactured by the method 200 of the present disclosure. Therefore, as compared to conventional methods for manufacturing bearing blocks, the method 200 manufactures the bearing block 110 in such a way that the insert 124 is firmly retained by the bearing block 110 with minimal if any risk of the insert becoming loose.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A bearing block adapted for use in a gear pump assembly, the bearing block comprising:
   a bearing surface configured to face one or more gears of the gear pump assembly;
   a bearing block body formed with a recess, and
   an insert located within the recess of the bearing block body, the recess and insert being shaped so as to be of smaller dimensions at the bearing surface of the bearing block than at a point remote therefrom within the bearing block, wherein the insert comprises:
      an insert body comprising an outer surface, the insert body having a tapered shape that tapers outwardly from the bearing surface; and
      a plurality of ridges disposed on the outer surface of the insert body, the plurality of ridges defining one or more grooves therebetween;
   wherein the recess comprises a tapered shape complementary to the tapered shape of the insert body, such that the insert body engages with the bearing block body, and wherein a material of the bearing block body plastically deforms around the plurality of ridges and flows into each of the one or more grooves to improve a mechanical retention of the insert within the recess.

2. The bearing block of claim 1, wherein the tapered shape of each of the insert body and the recess is frustoconical.

3. The bearing block of claim 1, wherein each of the plurality of ridges is annular.

4. The bearing block of claim 1, wherein the insert is made of aluminium bronze.

5. The bearing block of claim 1, wherein the material of the bearing block body is lead bronze.

6. The bearing block of claim 1, wherein the insert is flush or substantially flush with the bearing surface.

7. A gear pump assembly for pumping a fluid, the gear pump assembly comprising:
   an inlet configured to receive the fluid;
   an outlet;
   a plurality of the bearing blocks of claim 1; and
   a pair of intermeshing gears located between the plurality of bearing blocks and rotatable to pump the fluid from the inlet to the outlet.

8. A fuel supply system of a gas turbine engine, the fuel supply system comprising the gear pump assembly of claim 7 for pumping a fuel.

9. A method of manufacturing the bearing block of claim 1, the method comprising the steps of:
   providing the recess in the bearing block body;
   pushing the insert into the recess of the bearing block body; and
   subjecting the bearing block body to a hydrostatic pressure that causes the material of the bearing block body to plastically deform around the plurality of ridges and flow into each of the one or more grooves, thereby improving the mechanical retention of the insert within the recess.

* * * * *